United States Patent
Wang

(10) Patent No.: US 7,188,812 B2
(45) Date of Patent: Mar. 13, 2007

(54) SELF-LOCKING SUPPORT ARM

(75) Inventor: Chia-Ming Wang, Shenkeng Township, Taipei County (TW)

(73) Assignee: Sallas Industrial Co., Ltd., Taipei County (TW)

( * ) Notice: Subject to any disclaimer, the term of this patent is extended or adjusted under 35 U.S.C. 154(b) by 365 days.

(21) Appl. No.: 10/804,059

(22) Filed: Mar. 19, 2004

(65) Prior Publication Data

US 2005/0205734 A1 Sep. 22, 2005

(51) Int. Cl.
*E04G 3/00* (2006.01)
(52) U.S. Cl. .................. 248/276.1; 248/917; 248/919; 248/922; 248/284.1
(58) Field of Classification Search ............ 248/284.1, 248/278.1, 276.1, 274.1, 279.1, 286.1, 919, 248/917, 922, 923
See application file for complete search history.

(56) References Cited

U.S. PATENT DOCUMENTS

| | | | | |
|---|---|---|---|---|
| 5,799,917 A | * | 9/1998 | Li ........................... | 248/284.1 |
| 5,975,472 A | * | 11/1999 | Hung ....................... | 248/278.1 |
| 6,012,693 A | * | 1/2000 | Voeller et al. ......... | 248/280.11 |
| 6,478,275 B1 | * | 11/2002 | Huang ..................... | 248/284.1 |
| 6,695,274 B1 | * | 2/2004 | Chiu .......................... | 248/371 |
| 6,769,657 B1 | * | 8/2004 | Huang ..................... | 248/278.1 |

* cited by examiner

*Primary Examiner*—Kimberly Wood
*Assistant Examiner*—Timothy S. Smith
(74) *Attorney, Agent, or Firm*—Rosenberg, Klein & Lee

(57) ABSTRACT

A self-locking support arm is provided, comprising a hang arm and a linked device between a support seat and a connecting seat, which forms a set of four parallel connected rods. Therefore, when the support arm moving up and down, the connecting seat will maintain a fixed angle. A spring device is disposed between the hang arm and the linked device to provide tension of auto homing to the support arm. And, in a rotating joint formed by the linked device and the support seat, a ramp block and a ramp slider block is engaged, to provide an effect of self-locking, and better loading capacity.

6 Claims, 11 Drawing Sheets

SELF-LOCKING SUPPORT ARM

BACKGROUND OF THE INVENTION

1. Field of the Invention

The present invention relates to a support arm. Especially, the present invention relates to a support arm, which is capable of automatically self-locking. The support arm not only has a function of being locked for positioning, but also has a benefit of supporting a heavier load.

2. Description of the Related Art

As the era and age of information technology comes, more and more processes or works must be done through the use of computer equipment, either in work or in live. However, computer equipments such as a mouse, a printer, a scanner, a display monitor, or a keyboard, takes a lot of space on the desk or table. Especially, when the desk is small, it is inconvenient to use or operate for a user. Notwithstanding the foregoing, when the computer equipments are installed, their height and angle are not suit for users of different sizes. As a result, injuries suffered on the job are open caused by using computer equipments, such as carpal tunnel syndrome and repetitive strain injury affected arms, hands eyes, muscles, and even bones. The computer equipments are often placed on support arms having flexible structure for reducing the injuries.

A common used support arm is shown in FIG. 1. The conventional support arm consists of a chassis 10, a front arm 17, a hang arm 20, a connecting rod 25, and a spring 27. The chassis 10 is a base frame having a shape like "U". The front arm 17 is a frame having a shape like reversed "U". The front arm 17 is provided at its top with a swing joint 171 and a connecting plate 173. The hang arm 20 is a connecting rod having a cross-section like reversed "U". The both lower ends of the side walls of the reversed "U" of the hang arm 20 are provided with a first axel bolt 11 so as to be assembled to the chassis 10. The lower end of hang arm 20 forms a rotatable joint with the chassis 10 by the first axel bolt 11. The both upper ends of the side walls of the reversed "U" of the hang arm 20 are provided with a second axel bolt 12. The second axel bolt 12 is assembled with the front arm 17. The upper end of the hang arm 20 forms a rotatable joint with the front arm 17 by the second axel bolt 12. The both upper ends of the hang arm 20 are respectively provided with arc slots 21. A third axel bolt 13 is disposed through the arc slots 21 onto the side walls of the front arm 17, so as to fix the hang arm 20 to the front arm 17. Connecting rod 25 is a rod having a cross section like "U". The lower ends of both side walls of the connecting rod 25 are respectively provided with axel holes 251. A fourth axel bolt 14 is disposed through the axel holes 251 onto the chassis 10, to fix the connecting rod 25 to the chassis 10. Therefore, the lower end of the connecting rod 25 forms a rotatable joint with the chassis 10 by the fourth axel bolt 14. The both lower ends of the side walls of the connecting rod 25 are respectively provided with arc slots 253. The first axel bolt 11 is disposed through the arc slots 253. A third axel bolt 13 is disposed through the both upper ends of side walls of the connecting rod 25 onto the front arm 17, so that the both upper ends of the side walls of the connecting rod 25 form a rotatable joint with the front arm 17. The spring 27 is a coil type spring sleeved on the first axel bolt 11. One end of the spring 27 is disposed against the connecting rod 25, and the other end of the spring 27 is disposed against the fourth axel bolt 14, so as to provide an appropriate upward reaction force.

Please refer to FIGS. 2A, 2B, 3A, and 3B at the same time. FIG. 2A is a cross-sectional view of the conventional support arm at a first rotating angle. FIG. 2B is an enlarged cross-sectional view of the conventional support arm at the first rotating angle. FIG. 3A is a cross-sectional view of the conventional support arm at a second rotating angle. FIG. 3B is an enlarged cross-sectional view of the conventional support arm at the second rotating angle. As shown in the figures, a stop bolt 15 is disposed near the rear edges of the both side walls of the chassis 10. Arc edges 255, whose center is axel hole 251, are formed at the rear edges of the lower ends of both side walls of the connecting rod 25. The diameter of the axel hole 251 is larger than the diameter of a fourth axel bolt 14 disposed therein. The position of the stop bolt 15 is higher than the position of the fourth axel bolt 14. Therefore, when the connecting rod 25 is not moving, it will droop due to the weight of a LCD display monitor (not shown). The distance from the axel hole 251 to the arc edge 255 is larger the distance from the center of the fourth axel bolt 14 to the arc edge 255. The arc edges 255, formed at the rear edges of the lower ends of both side walls of the connecting rod 25, will engage with the stop bolt 15, to form a support force acting on the hang arm 20, in order to support the LCD display monitor (not shown) on the connecting plate 173 which is mounted on the front arm 17. Furthermore, the diameter of the axel hole 251 is larger than the diameter of the fourth axel bolt 14 disposed the axel hole 251, that is, there is a space formed between the axel bolt 251 and the fourth axel bolt 14. When the connecting rod 25 is lifted up slightly, the arc edges 255, formed at the rear edges of the lower ends of both side walls of the connecting rod 25, will disengage from the stop bolt 15. Then, the hang arm 20 and the connecting rod 25 can be moved smoothly, so as to adjust the position of the LCD display monitor.

The conventional display monitor support arm has the benefit of simple components. However, when operating and manufacturing, it still has deficiencies as stated below:

1. When support arm of the display monitor is adjusted to a required angle, it is positioned by the engagement of the stop bolt and the arc edges of the connecting rod to generate a friction force. After long time of use, the components will be worn which results in difficulty of positioning.

2. The supporting force for positioning comes from the engagement between the stop bolt and the arc edges, therefore its loading capacity will be limited.

3. The size and position of the axel hole of the connecting rod, the arc edges, and the fourth axel bolt must be precisely designed, manufactured, and assembled, in order to form the engagement. Therefore, it takes a lot of cost of manufacturing.

SUMMARY OF THE INVENTION

According to the deficiencies of the conventional support arm stated above, there is a need of the present invention to provide a new design of support mechanism, which is capable of automatic locking, homing, and increasing loading capacity, and to maintain a fixed angle between the support seat and the ground when rotating.

Thus there is a primary object of the present invention to provide a support arm for automatic locking, which forms a set of four parallel connected rod, that is capable of positioning by self locking, and to adjust the height of the support arm by user, by cooperating with a ramp block, a ramp slider block, and a spring device.

Another object of the present invention is to provide an automatic locking support arm. The support arm contains a disk for reducing the needed rotating angle of the support arm, while the support arm is rotated to lock, and further enhancing the friction force to increase loading capacity of the support arm.

Another object of the present invention is to provide an automatic locking support arm, which is capable of enlarging the range that the support arm can reach by using a connecting frame, to fulfill the need of operation of user.

Another object of the present invention is to provide an automatic locking support arm, which is capable of maintaining an appropriate fixed angle of a connecting seat, when the support arm is rotating or after positioning.

To achieve the above purpose, the present invention provides a support arm, which is able to be locked automatically and comprise a support chassis, a connecting seat, a hang arm, a spring device and a linked device. The support chassis includes a connecting cylinder, wherein at least one support wing is provided at one end of the connecting cylinder, and a first support axle hole and a second support axle hole are provided on the proper positions of the support wing. The connecting seat includes a connecting cylinder, wherein the connecting cylinder is provided with at least one connecting wing at one end of the connecting cylinder. A ramp block and a second connecting axle hole are provided on the proper positions of the connecting wing. The second connecting axle hole is able to penetrate through the connecting wing and the ramp block at the same time. A first connecting axle hole and a connecting arc slot are provided on the connecting wing. The hang arm includes a hollow cylinder, wherein a flange is provided on the inner surface of the hollow cylinder. At least one upper clamp disk and at least one lower clamp are provided separately at both ends of the hollow cylinder. The upper clamp disk is provided with a first upper clamp disk axle hole, a second clamp disk axle hole and an upper arc slot. The lower clamp disk is provided with a first lower clamp disk axle hole and a lower arc slot. A spring device includes at least one latch unit, one upper washer, one spring and one lower washer wherein both of the upper washer and the lower washer are provided with an axle hole. The linked device comprises at least one upper connecting rod, at least one lower connecting rod, at least one upper connecting block, at least one lower connecting block, at least one screw bolt and at least one ramp slider block. The upper connecting rod is provided with a first upper connecting rod hole and a second upper connecting rod hole at both ends. The lower connecting rod is provided with a first lower connecting rod hole and a second lower connecting rod hole at both ends. The upper connecting block is provided with an upper side slot and an upper connecting axle hole at one end and an upper connecting screw hole at another end. The lower connecting block is provided with a lower side slot and a lower connecting axle hole at one end and a lower connecting screw hole at another end. The ramp slider block is provided with a slider axle hole and a side slot, which is in accordance with the ramp block. Besides, an upper bolt is plugged through the upper connecting axle hole and the first upper connecting rod hole to connect the upper connecting block and the upper connecting rod. A lower bolt is plugged through the lower connecting axle hole and the first lower connecting rod hole to connect the lower connecting block and the lower connecting rod. Moreover, the screw bolt is able to penetrate through the lower washer, the spring and the upper washer. Then the screw bolt is screwed by the latch unit against the upper washer in order to be sleeved into the hollow cylinder of the hang arm. Therefore, the lower washer is lodged in the flange. The upper connecting block and the lower connecting block are locked into both ends of the screw bolt to form a linked device. The spring device is provided between the linked device and the hang arm, therefore the linked device, the spring device, and the hang arm form an arm set. The hang arm and the support seat are able to rotate relatively by plugging a first axle bolt through the first lower clamp disk axel hole and the first support axle hole. The hang arm and the connecting seat are able to rotate relatively by plugging a second axle bolt through the first upper clamp disk axel hole and the first connecting axle hole. The linked device and the hang arm are able to displace relatively when the linked device and the support seat rotate relatively by plugging a third axle bolt through the lower arc slot, the second support axle hole and the second lower connecting rod hole. The linked device and the hang arm are able to displace relatively when the linked device and the connecting seat rotate relatively by plugging a fourth axle bolt through the upper arc slot, the second connecting axle hole, the slider axle hole and the second upper connecting rod hole.

BRIEF DESCRIPTION OF THE DRAWINGS

The present invention will be more fully understood from the detailed description given hereinafter with reference to and the accompanying drawings which are given by way of illustration only, and thus are not limitative of the present invention and wherein.

DETAILED DESCRIPTION OF PREFERRED EMBODIMENTS

Figure 1:
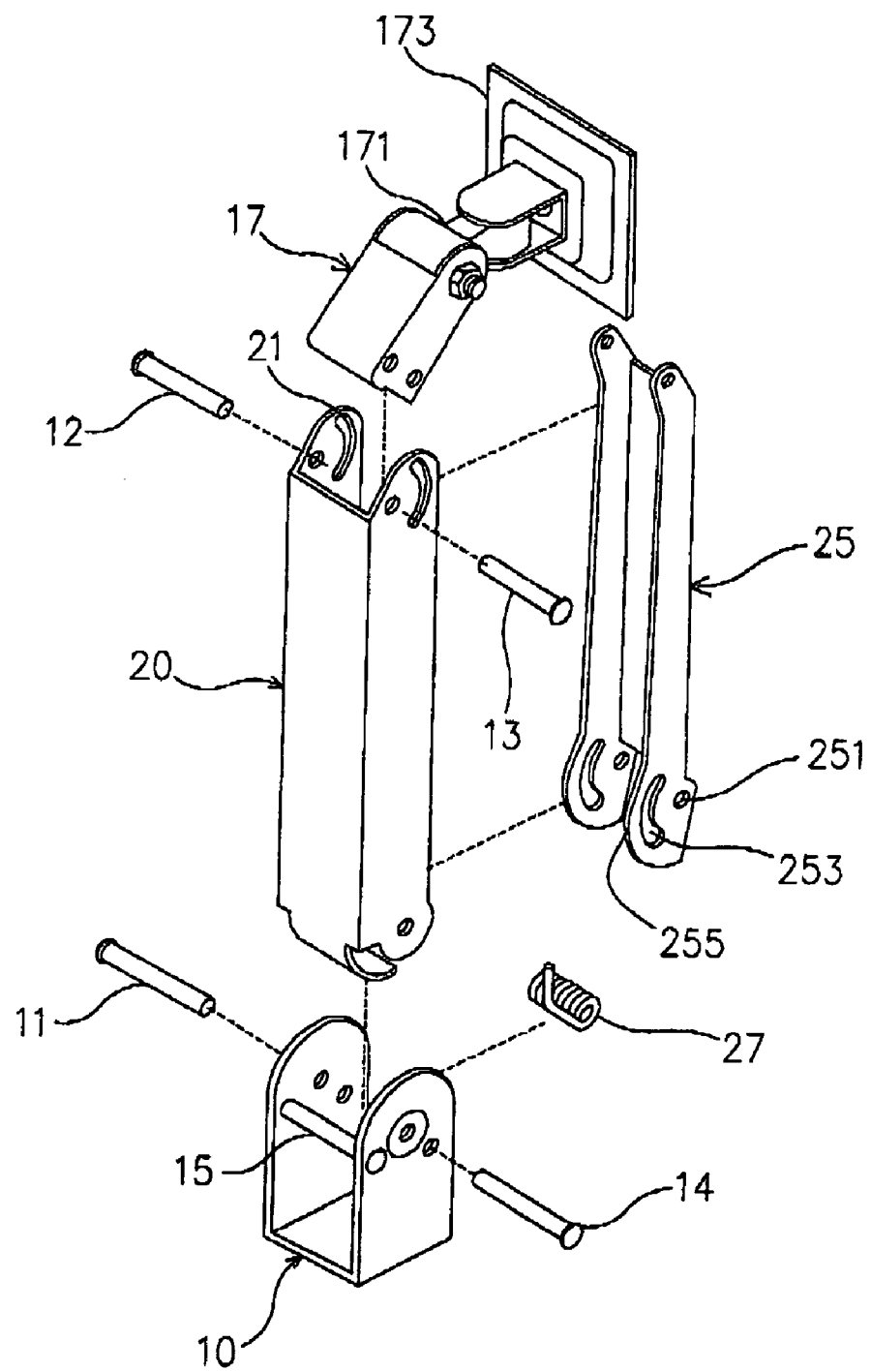
FIG. 1 is a perspective exploded diagram of a conventional support arm.
Figures 2A, 2B:
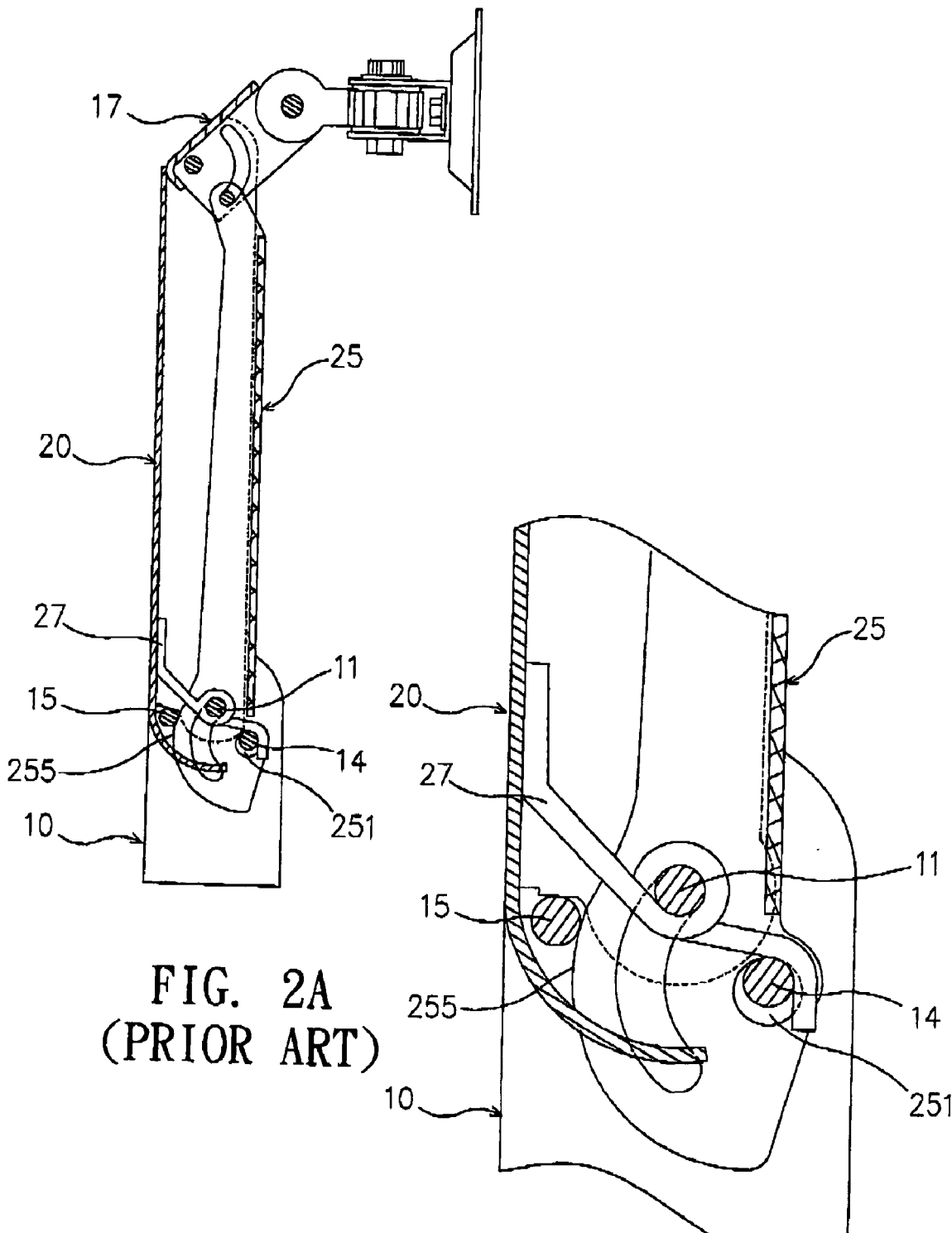
FIG. 2A is a cross-sectional view of the conventional support arm at a first rotating angle.
FIG. 2B is an enlarged cross-sectional view of the conventional support arm at the first rotating angle.
Figure 3A:
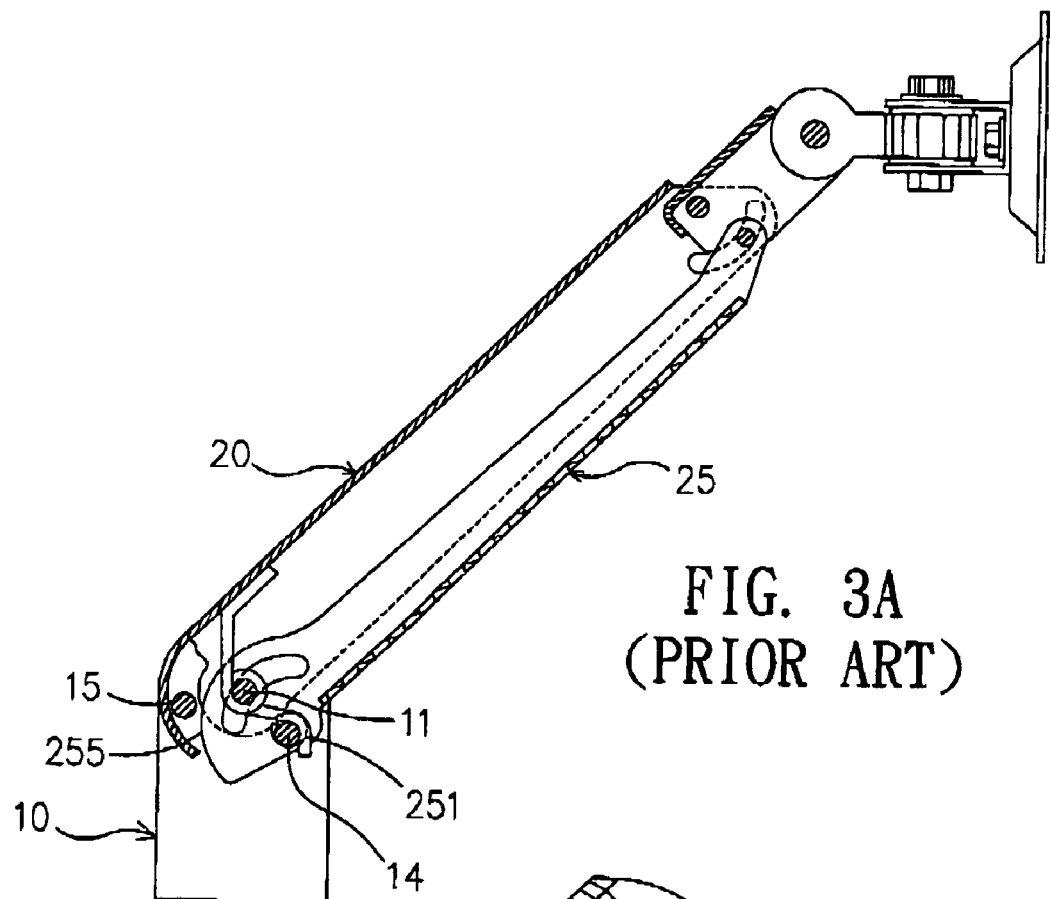
FIG. 3A is a cross-sectional view of the conventional support arm at a second rotating angle.
Figure 3B:
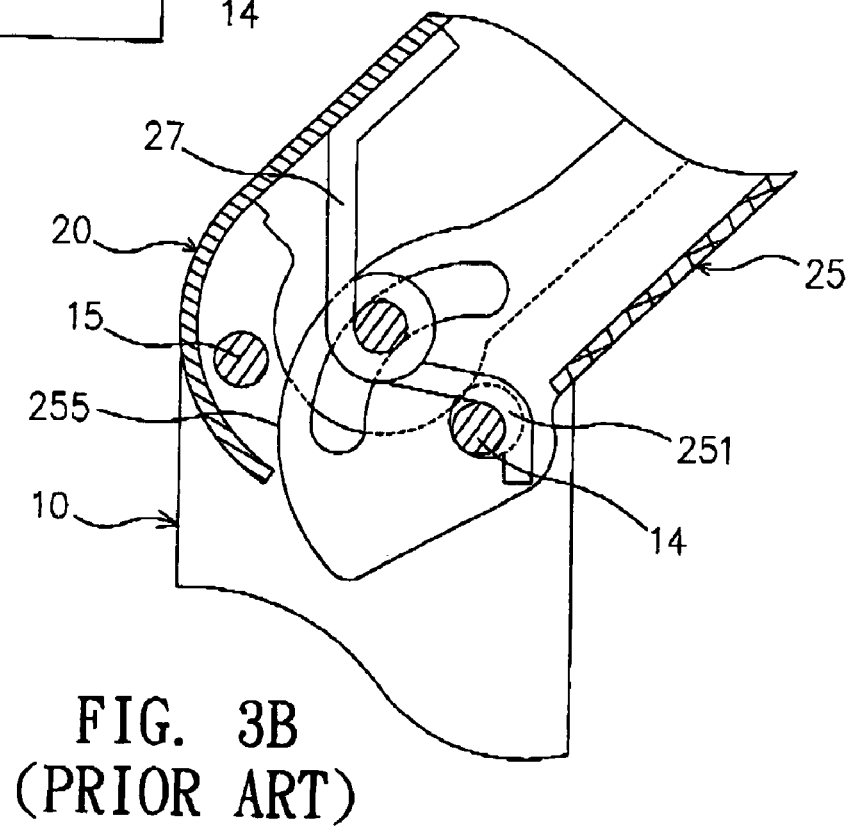
FIG. 3B is an enlarged cross-sectional view of the conventional support arm at the second rotating angle.
Figure 4A:
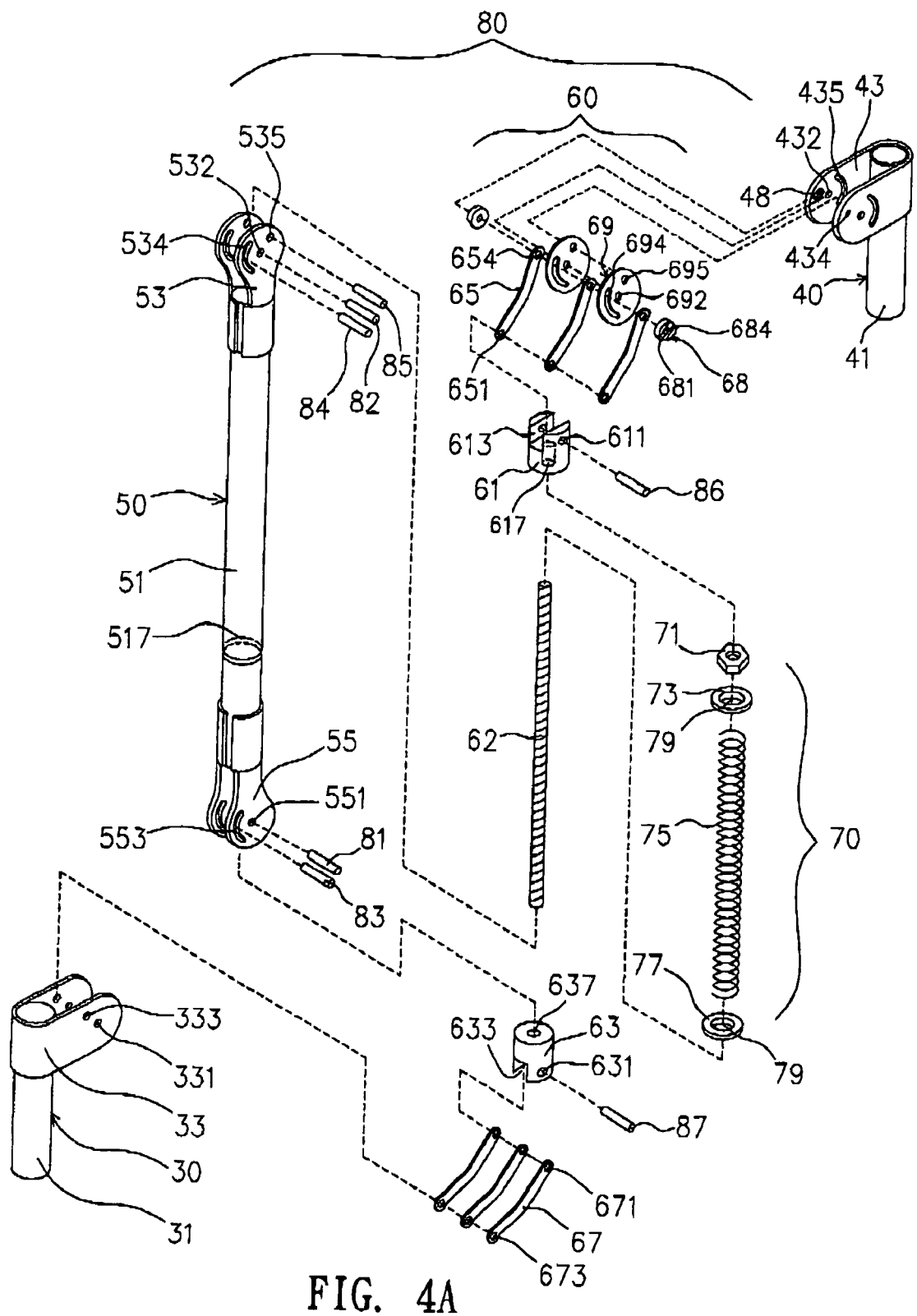
FIG. 4A is a perspective exploded diagram of a preferred embodiment of the present invention.
Figure 4B:
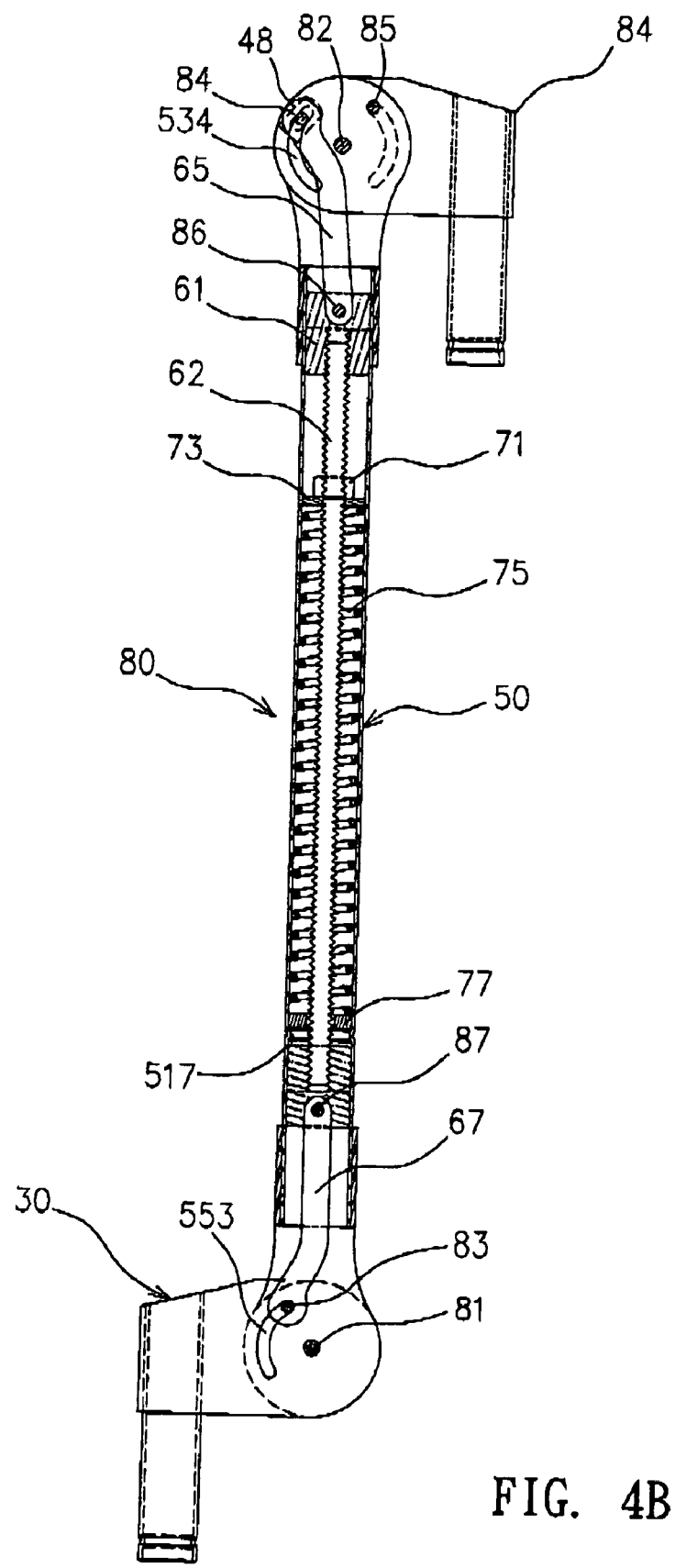
FIG. 4B is a side cross-sectional view of a preferred embodiment of the present invention.

Please refer to FIGS. 4A and 4B. FIG. 4A is a perspective exploded diagram of a preferred embodiment of the present invention. FIG. 4B is a side cross-sectional view of a preferred embodiment of the present invention.

As shown in the figures, the present invention provides a support arm comprise a support chassis 30, a support cylinder 31, a connecting seat 40, a hang arm 50, a spring device 70 and a linked device 60.

The support chassis 30 includes a connecting cylinder 31, wherein at least one support wing 33 is provided at one end of the connecting cylinder 31, and a first support axle hole 331 and a second support axle hole 333 are provided on the proper positions of the support wing 33.

The connecting seat 40 includes a connecting cylinder 41, wherein the connecting cylinder 41 is provided with at least one connecting wing 43 at one end of the connecting cylinder 41. On the proper positions of the connecting wing 43, a ramp block 48 and a second connecting axle hole 434 are provided as shown in FIG. 6. The second connecting axle hole 434 is able to penetrate through the connecting wing 436 and the ramp block 48 at the same time. Besides, a first connecting axle hole 432 and a connecting arc slot 435 are provided on the connecting wing 43.

The main structure of the hang arm 50 includes a hollow cylinder 51, wherein a flange 517 is provided on the inner surface of the hollow cylinder 51. At least one upper clamp disk 53 and at least one lower clamp 55 are provided separately at both ends of the hollow cylinder 51. The upper clamp disk 53 is provided with a first upper clamp disk axle hole 532, a second clamp disk axle hole 535 and an upper arc slot 534. The lower clamp disk 55 is provided with a first lower clamp disk axle hole 551 and a lower arc slot 553.

A spring device 70 includes at least one latch unit 71, one upper washer 73, one spring 75 and one lower washer 77 wherein both of the upper washer 73 and the lower washer 77 are provided with an axle hole 79.

The linked device 60 comprises at least one upper connecting rod 65, at least one lower connecting rod 67, at least one upper connecting block 61, at least one lower connecting block 63, at least one screw bolt 62, at least one disk 69 and at least one ramp slider block 68.

The upper connecting rod 65 is provided with a first upper connecting rod hole 651 and a second upper connecting rod hole 654 at both ends. The lower connecting rod 67 is provided with a first lower connecting rod hole 671 and a second lower connecting rod hole 673 at both ends. The upper connecting block 61 is provided with an upper side slot 613 and an upper connecting axle hole 611 at one end and an upper connecting screw hole 617 at another end. The lower connecting block 63 is provided with a lower side slot 633 and a lower connecting axle hole 631 at one end and a lower connecting screw hole 637 at another end. A first disk hole 692, a second disk hole 695 and a disk arc slot 694 are provided on the proper positions of the disk 69. The ramp slider block 68 is provided with a slider axle hole 684 and a side slot 681, which is in accordance with the ramp block 48.

Besides, an upper bolt 86 is plugged through the upper connecting axle hole 611 and the first upper connecting rod hole 651 to connect the upper connecting block 61 and the upper connecting rod 65. A lower bolt 87 is plugged through the lower connecting axle hole 631 and the first lower connecting rod hole 671 to connect the lower connecting block 63 and the lower connecting rod 67. Moreover, the screw bolt 62 is able to penetrate through the lower washer 77, the spring 75 and the upper washer 73. Then the screw bolt 62 is screwed by the latch unit 71 against the upper washer 73 in order to be sleeved into the hollow cylinder 51 of the hang arm 50. Therefore, the lower washer 77 is lodged in the flange 517. The upper connecting screw hole 617 and the lower connecting screw hole 637 are locked into both ends of the screw bolt 62 to form a linked device 60. The spring device 70 is provided between the linked device 60 and the hang arm 50, therefore the linked device 60, the spring device 70, and the hang arm 50 assemble to an arm set 80. Therefore, the assembly of the support arm structure is more flexible.

The hang arm 50 and the support seat 30 are connected with each other by plugging a first axle bolt 81 through the first lower clamp disk axel hole 551 and the first support axle hole 331. By the same way, the hang arm 50 and the connecting seat 40 are connected with each other by plugging a second axle bolt 82 through the first upper clamp disk axel hole 532 and the first connecting axle hole 432 and the first disk hole 692. The linked device 60 and the hang arm 80 are connected with each other by plugging a third axle bolt 83 through the lower arc slot 553, the second support axle hole 333 and the second lower connecting rod hole. The linked device 60 of the hang arm 80 are connected to the connecting seat 40 by plugging a fourth axle bolt 84 through the upper arc slot 534, the second connecting axle hole 434, the slider axle hole 684, the second upper connecting rod hole 654 and the disk arc slot 694. Therefore, a support arm with a structure of four parallel connected rods is formed. By penetrating a clamp bolt 85 through the second upper clamp disk axle hole 535 and the connecting arc slot 435, the clamp force of the upper clamp disk 53 is improved.

Figure 5A:
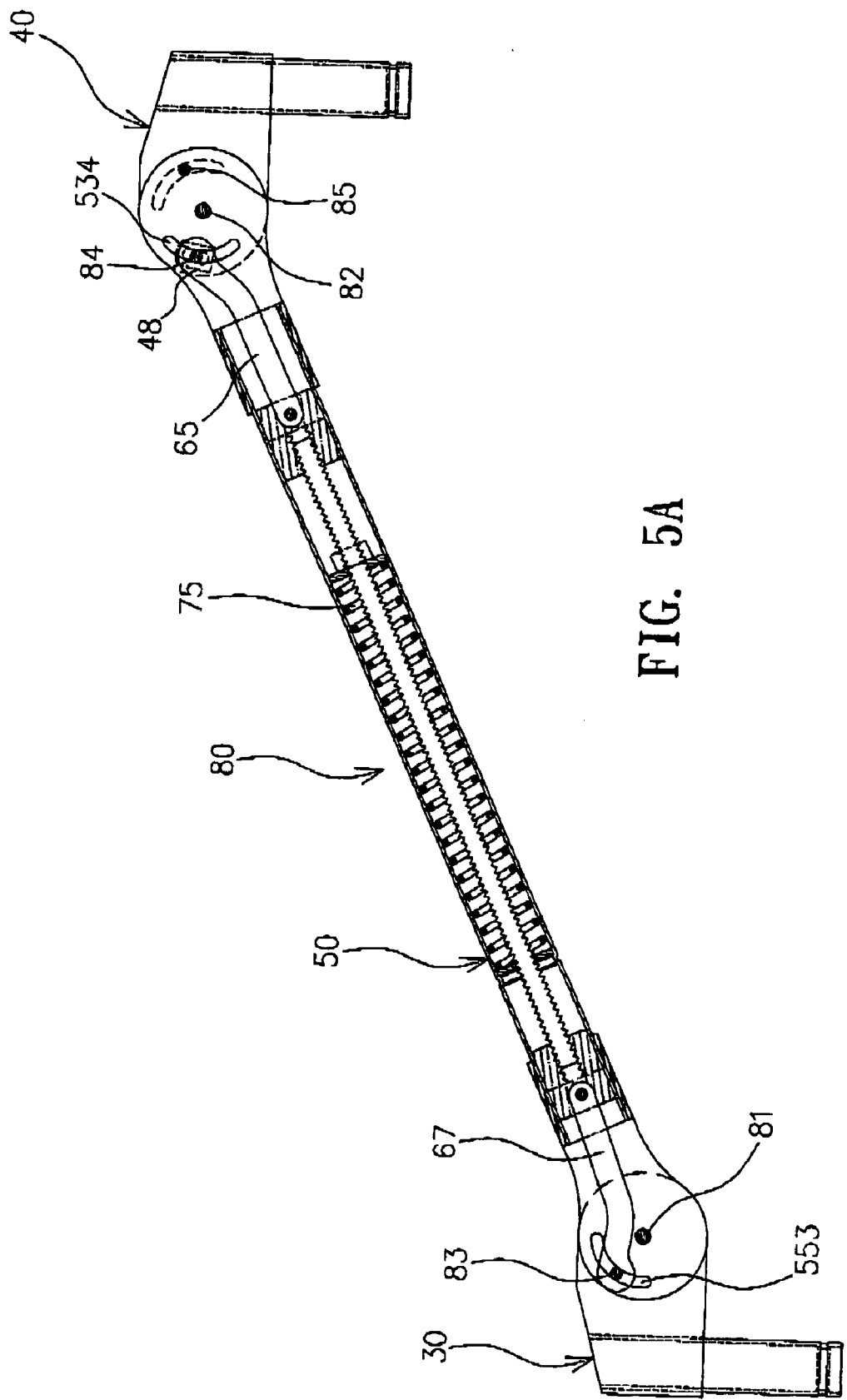
FIG. 5A is a side cross-sectional view of a preferred embodiment of the present invention at a first rotating angle.
Figure 5B:
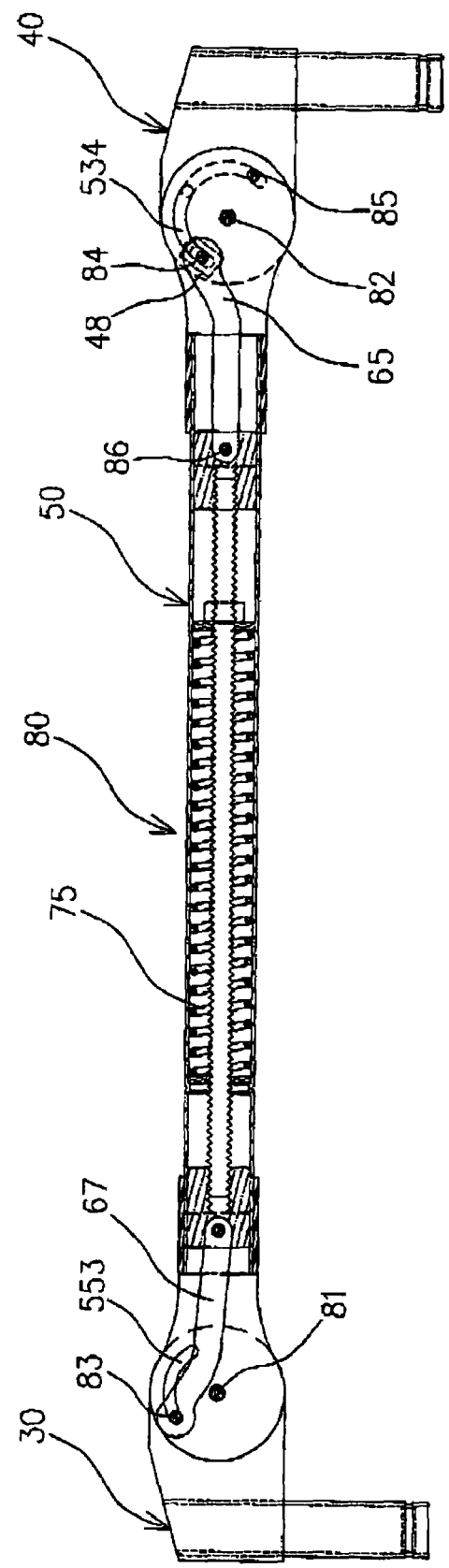
FIG. 5B is a side cross-sectional view of a preferred embodiment of the present invention at a second rotating angle.

Furthermore, please refer to FIGS. 5A and 5B. FIG. 5A is a side cross-sectional view of a preferred embodiment of the present invention at a first rotating angle, and FIG. 5B is a side cross-sectional view of the preferred embodiment of the present invention at a second rotating angle. As shown in figures, when the arm set 80 uses a the first axle bolt 81 as a revolving dot and the support seat 30 rotates relatively, the third axle bolt 83 of the support seat 30 will displace along the lower arc slot located on the hang arm 50. And the third axle bolt 30 is connected with the lower connecting bolt 67 of the linked device 60 so that the hang arm 50 and the linked device 60 will displace relatively. In this way, the fourth axle bolt 84, which is connected with the upper connecting bolt 65, will displace along the upper arc slot 534. Therefore, the connecting seat 40 will use the second axle bolt 82 as a revolving dot and rotates with the hang arm 50 relatively that keep a fixed angle between the connecting seat 40 and the ground during the rotating process of the hang arm. Furthermore, since the hang arm 50 and the linked device 60 displace relatively that could restore the plastic force of the spring 75 set up between the hang arm 50 and the linked device 60 and offer the support arm with automatic homing function.

Figure 6A:
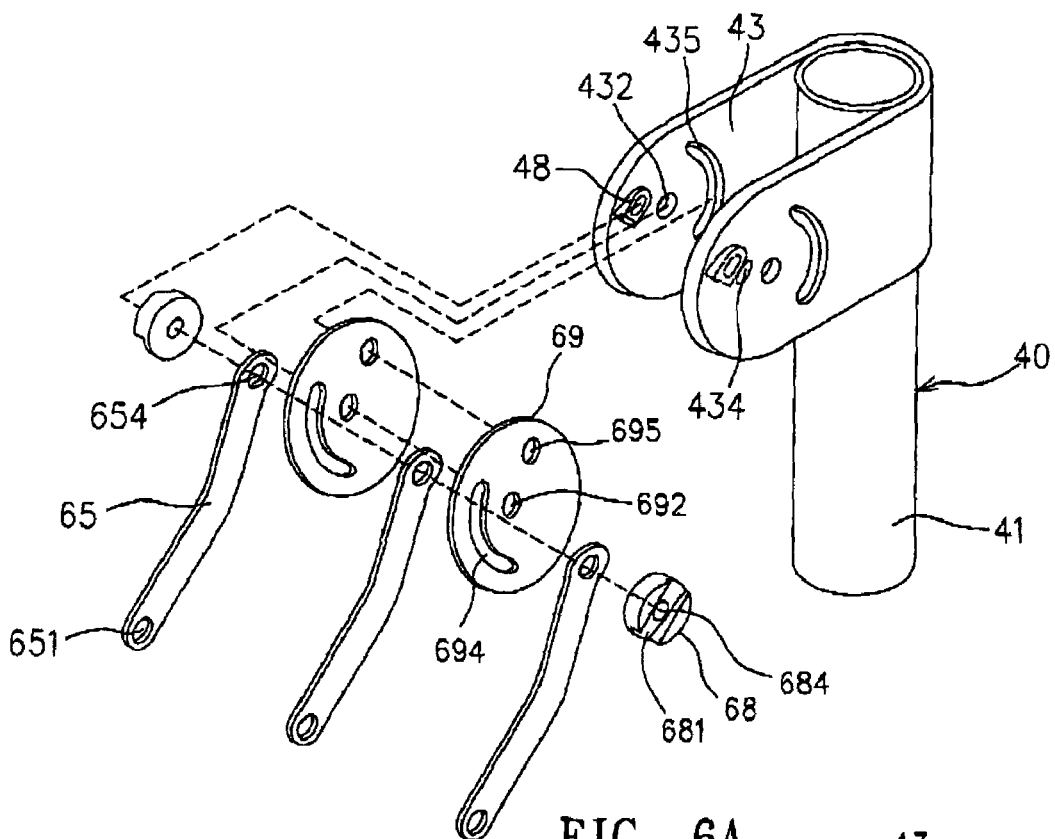
FIG. 6A is an enlarged perspective exploded view of a linked device and a connecting seat of a preferred embodiment of the present invention.
Figure 6B:
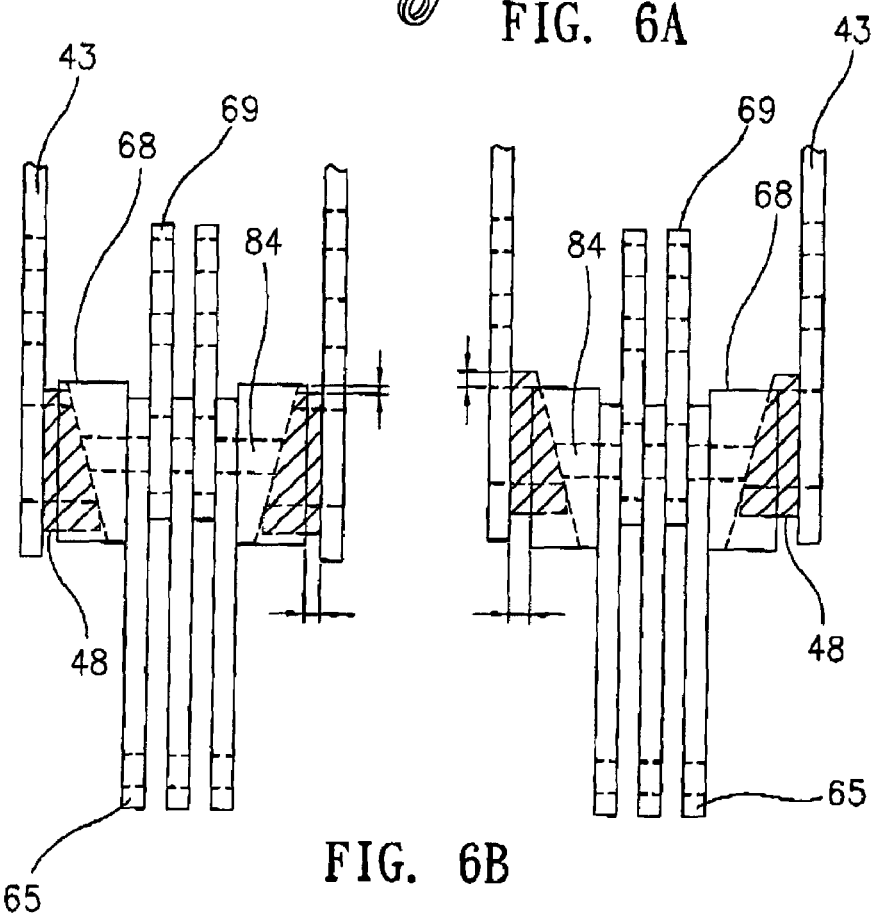
FIG. 6B is an enlarged top view of the present invention shown in FIG. 6A.

Please refer to FIGS. 6A and 6B. FIG. 6A is an enlarged perspective exploded view of a linked device and a connecting seat of a preferred embodiment of the present invention. FIG. 6B is an enlarged top view of the present invention shown in FIG. 6A. As shown in figures, the diameter of the second connecting axle hole 434 on the connecting seat 40 is larger than the diameter of the fourth axle bolt 84. When the connecting seat 40 is pressed down by carrying all kinds of computer accessories such as monitor, printer, key board, mouse, scanner etc. computer, the connecting seat 40 will rotate by using the second axle bolt 82 as a revolving dot. Thus the slide block 48 fixed on the connecting seat 40 will displace along the slide slot 681 on the ramp slider block 68 to increase the axial distance between the slide block 48 and the ramp slider block 68. The gaps between each component slipped on the fourth axle bolt increase accordingly. However, the distance formed between the upper clamp disk 53 is fixed, each component is tightly fitted, to result in a locking function of the support arm. Since the fourth axle bolt 84 penetrates the disk 69, the angle of rotation for the support arm to turn to lock is reduced, and the friction force is increased, to raise the carrying ability of the support arm.

Figure 7A:
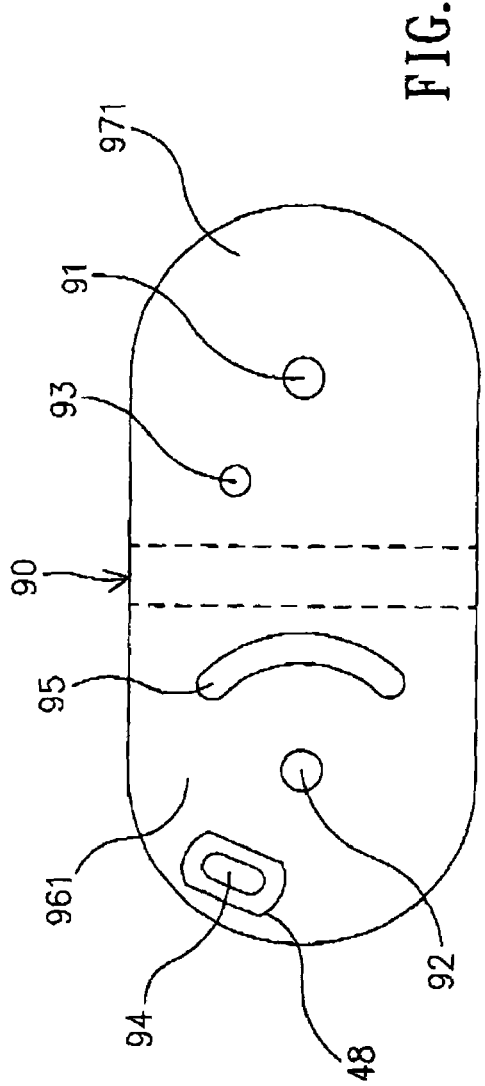
FIG. 7A is a side view of a connecting frame of a preferred embodiment of the present invention.
Figure 7B:
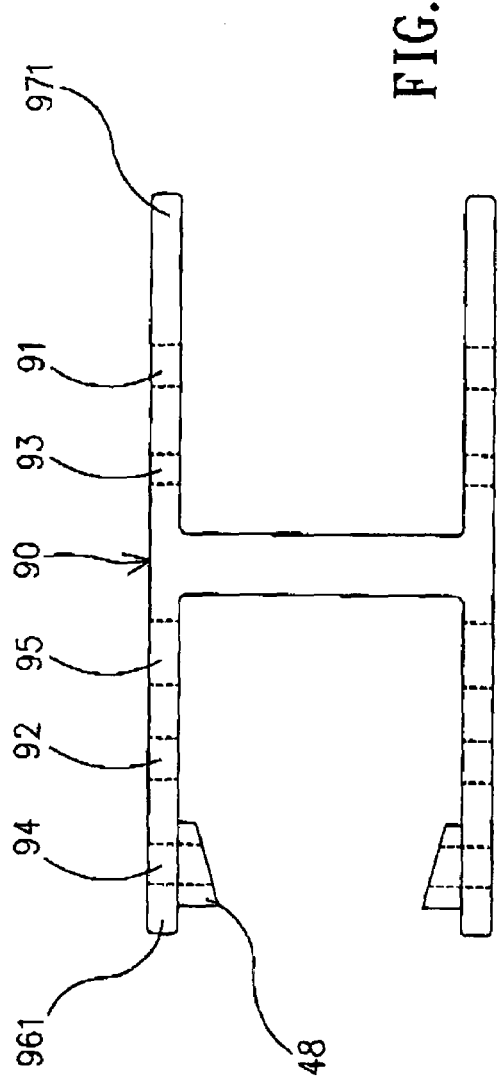
FIG. 7B is a top view of the present invention shown in FIG. 7A.

Please refer to the FIGS. 7A and 7B, which are side view and top view of another embodiment of the present invention. As shown in the figures, in this embodiment, a connecting frame 90 replaces the connecting seat 40 of the previous embodiment. The connecting frame 90 has a first side end 961. The first side end 961 has a ramp block 48 at a predetermined position of itself. The ramp block 48 has a ramp surface and a second left axle hole 94. The second left axle hole 94 penetrates the ramp block 48 and the connecting frame 90. The connecting frame 90 further has a first left axle hole 92 and a left arc slot 95. The function of the first left axle hole 92, the left arc slot 95, and the second left axle hole 94 is the same of the first connecting axle hole 434, the second connecting axle hole 432, and the connecting seat arc slot 435 of the connecting seat 40. The connecting frame 90 has a second side end 971. The second side end 971 has a first right axle hole 91 and a second right axle hole 93. The function of the first right axle hole 91 and the second right axle hole 93 is the same of the first support axle hole 331 and the second support axle hole 333 of the support seat 30.

Figure 8A:
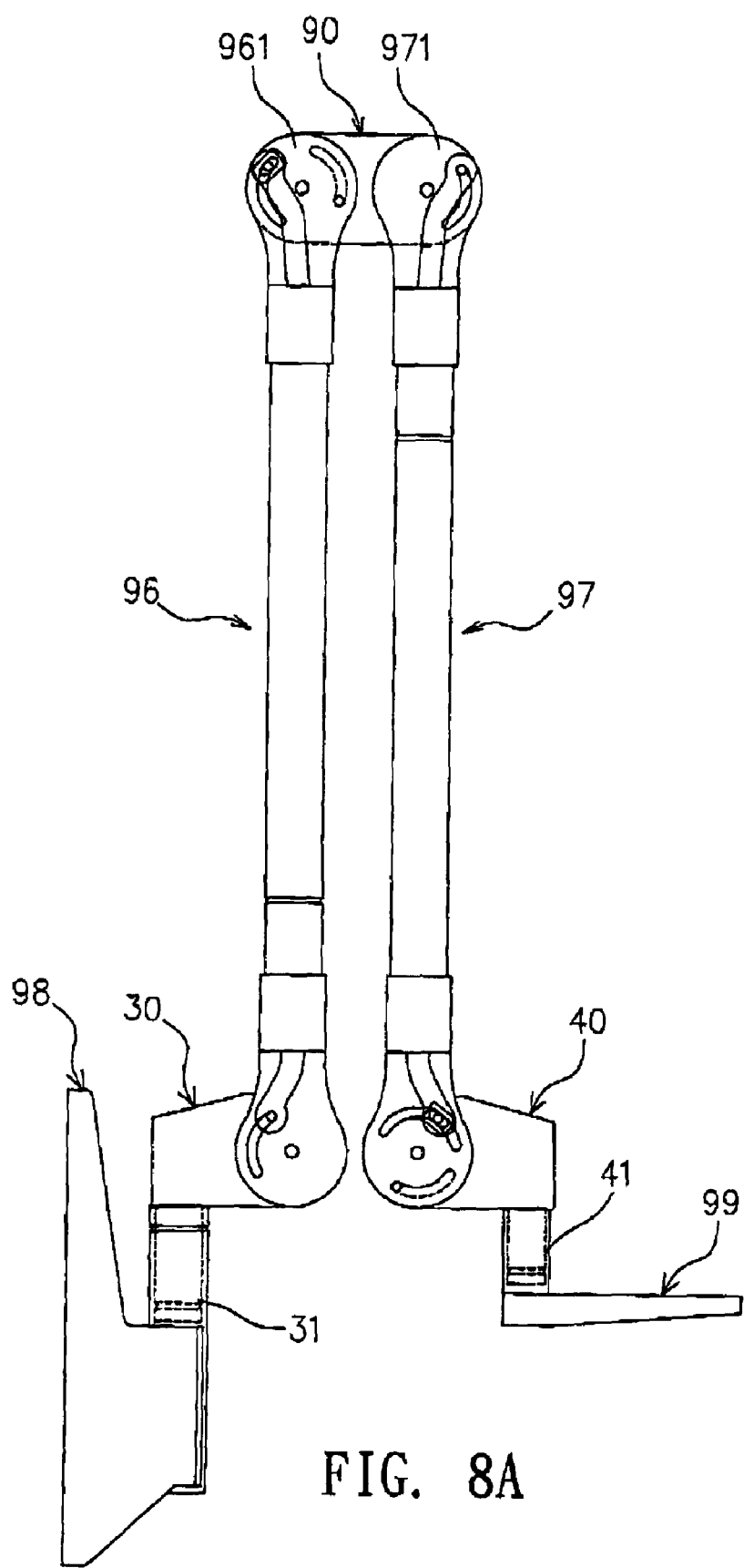
FIG. 8A is a side view of a preferred embodiment of the present invention at a first rotating angle.
Figure 8B:
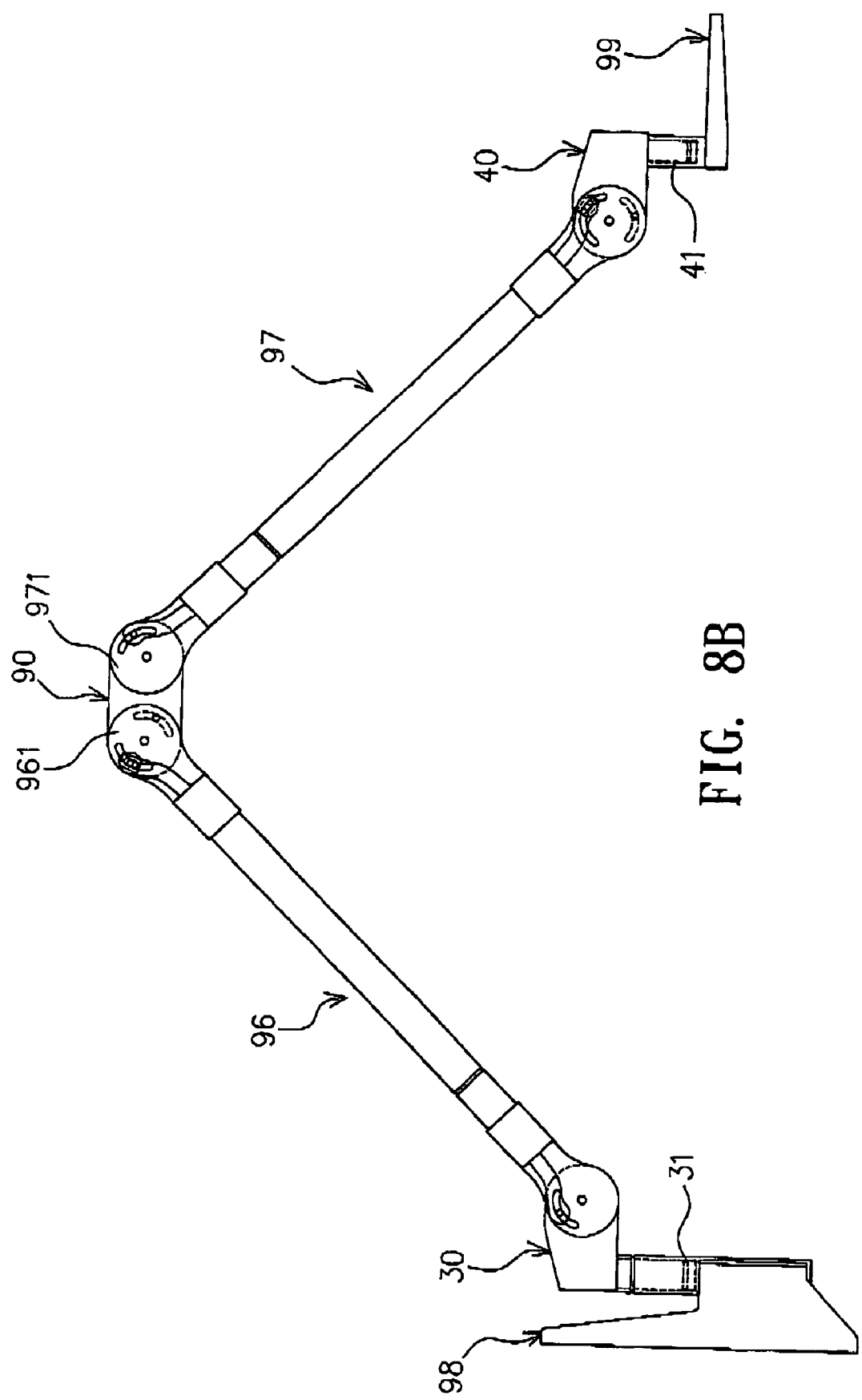
FIG. 8B is a side view of the preferred embodiment of the present invention shown in FIG. 8A at a second rotating angle.

Finally, please refer to the FIGS. 8A and 8B, which are side views of another embodiment of the present invention at a first rotating angle and a second rotating angle. As shown in the figures, the first side end 961 of the connecting frame 90 could be assembled with the above mentioned arm set 80 and support seat 30, to form a fist support arm 96. In the same way, the second side end 971 of the connecting frame 90 could be assembled with the above mentioned arm set 90 and connecting seat 40, to form a second support arm 97. Therefore, the effective range and distance of the support arm can be lengthened. More than two support arm can be used simultaneously to enlarge the assembly.

Besides, the support cylinder 31 of the support seat 30 could be inserted into a fixed base 98, so that the support seat 30 can rotate horizontally related to the fixed seat 98. A platform 99 can be provided on the connecting cylinder 41 of the connecting seat 40, so that the platform 99 could rotate horizontally related to the connecting seat 40. Therefore, the range that the platform 99 can reach is enlarged, and the height of the platform 99 can be adjusted at will to fit the size of the user, so at to implement ergonomics in the support arm.

While the invention has been described by way of examples and in terms of several preferred embodiments, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A support arm with automatic lock function, comprising:

a support chassis including a connecting cylinder, one end of said connecting cylinder provided at least one support wing, a first support axle hole and a second support axle hole provided on proper positions of said support wing;

a connecting seat including a connecting cylinder, one end of said connecting cylinder provided with at least one connecting wing, said connecting wing provided with a ramp block, a first connecting axle hole, a connecting arc slot being and a second connecting axle hole, said second connecting axle hole penetrated through said connecting wing and said ramp block, wherein the diameter of said second connecting axle hole is larger than the diameter of a fourth axle bolt;

a hang arm having hollow cylinder, wherein a flange is provided on the inner surface of said hollow cylinder, at least one upper clamp disk and lower clamp disk provided separately at both ends of said hollow cylinder, said upper clamp disk being provided with a first upper clamp disk axle hole, a second clamp disk axle hole and a upper arc slot, said lower clamp disk provided with a first lower clamp disk axle hole and a lower arc slot; a spring device having at least a latch unit, an upper washer, a spring and a lower washer, wherein both of said upper washer and said lower washer are provided with an axle hole; and;

a linked device comprising at least one upper connecting rod, lower connecting rod, upper connecting block, lower connecting block, screw bolt and ramp slider block, wherein said upper connecting rod is provided with a first upper connecting rod hole and a second upper connecting rod hole at both ends, and said lower connecting rod provided with a first lower connecting rod hole and a second lower connecting rod hole at both ends, one end of said upper connecting block provided with an upper side slot and an upper connecting axle hole and another end provided an upper connecting screw hole, one end of said lower connecting block provided with a lower side slot and a lower connecting axle hole, and another end provided a lower connecting screw hole, said ramp slider block provided with a slider axle hole and a side slot which is in accordance with the ramp block, wherein an upper bolt is plugged through said upper connecting axle hole and said first upper connecting rod hole to connect said upper connecting block and said upper connecting rod, a lower bolt plugged through said lower connecting axle hole and said first lower connecting rod hole to connect said lower connecting block and said lower connecting rod, wherein said screw bolt is able to penetrate through said lower washer, said spring and said upper washer, then said screw bolt is screwed by said latch unit against said upper washer in order to be sleeved into said hollow cylinder of said hang arm, said lower washer lodged in said flange, said upper connecting block and said lower connecting block locked into both ends of said screw bolt to form a linked device, said spring device provided between said linked device and said hang arm, therefore said linked device, said spring device, and said hang arm assembled an arm set, said hang arm and a support seat being able to rotate relatively by plugging a first axle bolt through said first lower clamp disk axel hole and said first support axle hole, said hang arm and said connecting seat being able to rotate relatively by plugging a second axle bolt through said first upper clamp disk axel hole and said first connecting axle hole, said linked device and said hang arm being able to displace relatively when said linked device and said support seat rotating relatively by plugging a third axle bolt through said lower arc slot, said second support axle hole and said second lower connecting rod hole, said linked device and said hang arm being able to displace relatively when said linked device and said connecting seat rotating relatively by plugging a fourth axle bolt through said upper arc slot, said second connecting axle hole, said slider axle hole and said second upper connecting rod hole.

2. The support arm of claim 1, wherein said support cylinder of said support scat is plugged into a fixed seat.

3. The support arm of claim 1, wherein said connecting cylinder of said connecting seat is plugged into a platform.

4. The support arm of claim 1 further comprising a clamp bolt, wherein said clamp bolt is penetrated through said second upper clamp disk axle hole and said connecting arc slot, to improve the clamp force of said upper clamp disk when said support arm locked.

5. The support arm of claim 1 further comprising at least one disk fixed between each of said upper connecting rods, wherein said disk is provided with a first disk hole, a second disk hole and a disk arc slot for said second axle bolt to penetrate through said first disk hole, said fourth axle bolt to penetrate said disk through said disk arc slot, and clamp bolt to penetrate through said second disk hole.

6. The support arm of claim 1, wherein said connecting seat is replaced by at least one connecting frame, a first side of said connecting frame provided with a first left axle hole, a second left axle hole, a ramp block and a left arc slot, and a second side of said connecting frame provided with a first right axle hole and a second right axle hole, such that said first side of said connecting frame is assembled with said arm set and said support seat to form a first support arm, and said second side of said connecting frame is assembled with another said arm set and said connecting seat to form a second support arm.

* * * * *